United States Patent [19]
Ohtomo et al.

[11] Patent Number: 5,767,952
[45] Date of Patent: Jun. 16, 1998

[54] SURVEYING INSTRUMENT

[75] Inventors: Fumio Ohtomo; Haruhiko Kobayashi; Satoshi Hirano, all of Tokyo-to, Japan

[73] Assignee: Kabushiki Kaisha TOPCON, Tokyo-to, Japan

[21] Appl. No.: 565,677

[22] Filed: Nov. 30, 1995

[30] Foreign Application Priority Data

Dec. 9, 1994 [JP] Japan ................................ 6-331867

[51] Int. Cl.$^6$ ............................ G01C 3/08; G01B 11/26
[52] U.S. Cl. ................. 356/4.01; 356/141.3; 356/151.1; 356/151.3
[58] Field of Search ................... 356/4.01–5.15, 356/141.3, 151.1, 151.3

[56] References Cited

U.S. PATENT DOCUMENTS

| | | |
|---|---|---|
| 3,898,007 | 8/1975 | Wiklund . |
| 3,907,435 | 9/1975 | Roodvoets . |
| 3,915,574 | 10/1975 | Hernqvist . |
| 4,029,415 | 6/1977 | Johnson . |
| 4,560,270 | 12/1985 | Wiklund et al. . |
| 5,051,934 | 9/1991 | Wiklund ...................... 364/561 |

*Primary Examiner*—Stephen C. Buczinski
*Attorney, Agent, or Firm*—Nields, Lemack & Dingman

[57] ABSTRACT

A surveying instrument, which comprises an object to be irradiated, a projection system provided on a range finder or on a range finding angle measuring instrument having a range finder and for emitting a laser beam toward the object, driving means for driving a laser emitting source of the projection system, and control means for controlling emitting condition of the laser beam via the driving means based on a distance data from the range finder to the object to be irradiated, whereby, in case there is a deviation between the preset distance and a distance measured by the range finder, the control means changes irradiation intensity of the laser beam, or in case there is a deviation between the preset distance and a distance measured by the range finder, the control means changes irradiation intensity of the laser beam and also changes time interval of the intensity changes according to extent of the deviation, and position information and instruction are transmitted to the object to be irradiated side using the laser beam as an information transmitting medium to facilitate positioning of the object to be irradiated.

9 Claims, 4 Drawing Sheets

SURVEYING INSTRUMENT

BACKGROUND OF THE INVENTION

The present invention relates to a surveying instrument, which facilitates the setting of a datum point when the datum point is to be set with respect to a known point in a surveying operation.

In surveying operation, there is a process to set a datum point in a given direction and at a given distance from a known point. About a decade ago, it was customary to install a theodolite of optical reading type at a known point, to determine the direction and to measure the distance up to a datum point by a tape measure. At present, a light wave range finder is used for measuring the distance, and a digital theodolite is used as the theodolite. In the past, the operation for setting a datum point has been performed as follows:

A theodolite connected with a light wave range finder or a total station having a digital theodolite with a built-in light wave range finder is installed at a known point, which is a reference point of the station of triangulation, and a reflection prism is set up at an approximate position of the datum point. Normally, a pole with the reflection prism is moved and carried by an assistant. The reflection prism on the datum point is collimated from the known point. When the reflection prism is relatively closer to the known point, instruction is given to the datum point side by a hand signal, and radio equipment is used when the reflection prism is relatively distant. Such instruction are continuously given until the reflection prism is installed accurately at the position of the datum point.

In recent years, a point guide 2 of removable type as shown in FIG. 8 or a point guide 2 integrated with the total station 1 has been introduced.

The point guide 2 is a kind of light used for confirming the collimating direction of the surveying instrument from the datum point side. The point guide 2 emits a colored light 3 of different colors to the left and right and to the center of the collimating direction of the surveying instrument. The surveyor at the datum point side can judge whether he is at the left or right or at the center of the direction by collimating the colored light 3 and identifying the color.

The conventional method to set up the datum point as described above has the following disadvantages:

First, in the method to give instructions to the worker at the datum point side using radio equipment and to move the reflection prism in front-rear or left-light directions, it is easy to give rough instructions. However, as it goes closer to the datum point, more detailed instruction, i.e. to move forward, rearward, leftward or rightward, must be given, and the instructions must be given very frequently. Because the instruction is given to the datum point side only after judging on the known point side whether the position of the prism is adequate or not, the instruction is often delayed. As a result, due to the delayed instruction or complicated instruction, it is often difficult to coordinate the position of the prism using radio equipment as it goes closer to the position of the datum point.

Next, in case of a surveying instrument equipped with a point guide in the latter case, the positioning at left or right can be easily confirmed from the datum point side using the point guide, whereas the positioning in the front-rear direction must be instructed by radio equipment. This also causes complicated or delayed instruction although inconveniences are relatively less compared with the conventional method for positioning. Further, crosstalk often occurs when radio equipment is used, and the instructions are often not transmitted accurately or reliably.

SUMMARY OF THE INVENTION

To solve the above problems, it is an object of the present invention to provide a surveying instrument, by which it is possible to transmit information for positioning to the datum point side when an object to be irradiated is set and to facilitate the positioning not only in the left-right direction but also in the front-rear direction. The surveying instrument of the present invention comprises an object to be irradiated, a projection system provided on a range finder or on a range finding angle measuring instrument having a range finder and for emitting a laser beam toward the object, driving means for driving a laser emitting source of the projection system, and control means for controlling emitting condition of the laser beam via the driving means based on distance data from the range finder to the object to be irradiated. The invention also provides a surveying instrument, wherein the control means changes the irradiation intensity of the laser beam in case there is a deviation between the preset distance and a distance measured by the range finder, or the control means changes the irradiation intensity of the laser beam and time interval of the intensity change according to the extent of deviation in case there is a deviation between the preset distance and a distance measured by the range finder. The invention also provides a surveying instrument, wherein the laser beam from the projection system is modulated. Further, the invention provides a surveying instrument, wherein the object to be irradiated is provided with a guide target, to which a guiding laser beam from the projection system is irradiated, and with a prism of range finding. Further, the present invention provides a surveying instrument, wherein the object to be irradiated comprises light receiving means for receiving a guiding laser beam and display means for displaying position information of the object to be irradiated from the range finder or from the range finding angle measuring instrument having a range finder and for displaying instruction to the object to be irradiated based on the output from the light receiving means. The invention also provides a surveying instrument, wherein the object to be irradiated comprises light receiving means for receiving a guiding laser beam and an audio output means for outputting audio signal of position information of the object to be irradiated obtained from the range finder or from the range finding angle measuring instrument having a range finder or of the instruction to the object to be irradiated based on the output from the light receiving means.

DETAILED DESCRIPTION OF THE PREFERRED EMBODIMENTS

Figure 1:
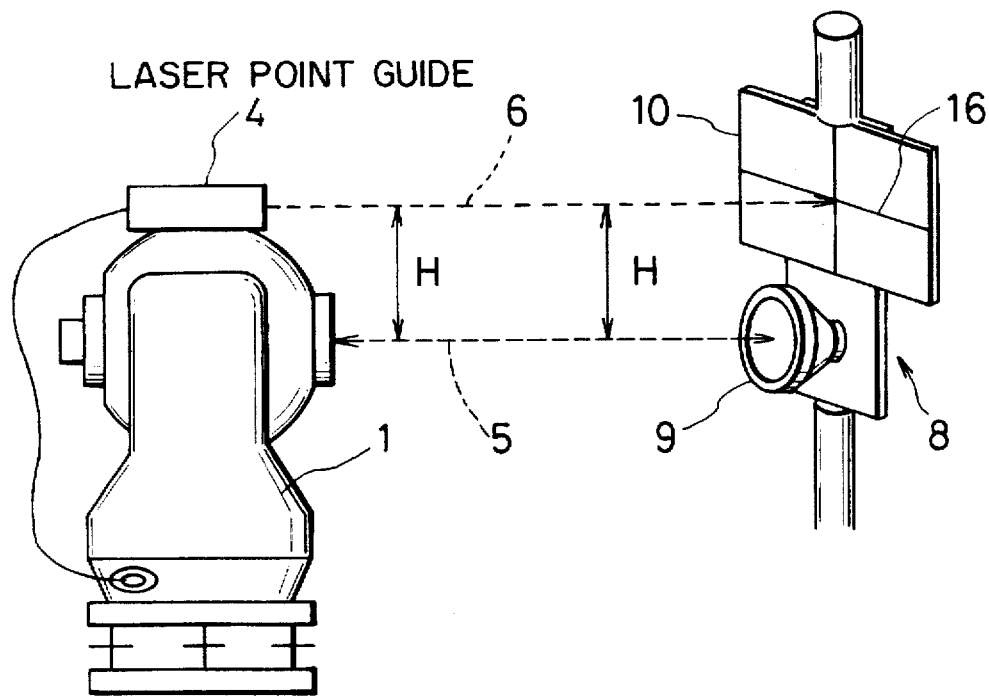
FIG. 1 is a schematical drawing of an embodiment of the present invention.

In the following, description will be given on an embodiment of the present invention referring to the drawings.

A laser point guide 4 is set up at the upper end of a total station 1. The laser point guide 4 emits a guiding laser beam 6 having an optical axis in parallel to the optical axis of a range finding laser beam 5 coming from the total station 1.

An object to be irradiated, i.e. a target 8, installed on a datum point side comprises a prism 9 for reflecting the range finding laser beam 5 and a guide target 10 matching the laser point guide 4. The target center of the guide target 10 is separated from the optical center of the prism 9 by a distance H between an optical axis of the range finding laser beam 5 and an optical axis of the guiding laser beam 6.

Figure 2:
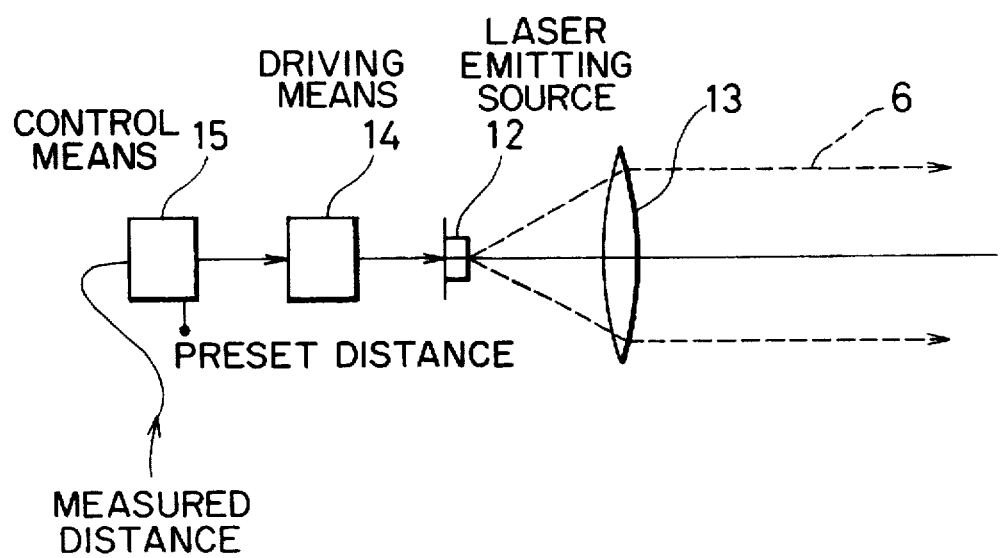
FIG. 2 shows an arrangement of a laser point guide in the above embodiment.

Description will be given now on an arrangement of the laser point guide 4 referring to FIG. 2.

The laser point guide 4 comprises a laser beam projection system having a laser emitting source 12, a collimator lens 13, etc. The laser beam from the laser emitting source 12 is turned to parallel beams by the collimator lens 13, and it is irradiated from the laser point guide 4 as the guiding laser beam 6. The laser emitting source 12 is driven and the laser beam is emitted by driving means 14, which comprises a power source, a modulation circuit, an amplifier circuit, a switching circuit, etc., and the driving means 14 is controlled by control means 15.

To the control means 15, a distance up to the datum point can be set and inputted by ten-key (not shown) ,etc. of an operation unit, and a measured distance data signal from the total station 1 can be inputted. The deviation between the preset distance and the measured distance is calculated, and a driving control signal is inputted to the driving means 14 according to the extent of deviation, and a on-off of the laser emitting source 12 and an increase or decrease of laser output are controlled by the driving means 14.

Next, description will be given on the operation.

The total station 1 is set up in the direction toward the datum point. The laser emitting source 12 is driven by the driving means 14 to use the guiding laser beam 6, and the target 8 is set up at an approximate position of the datum point. From the relationship between the irradiating position of the guiding laser beam 6 and a collimation line 16 marked on the guide target 10, positioning can be performed accurately in the vertical and horizontal (left-right) directions. The positioning in the front-rear direction is carried out as follows:

The total station 1 measures the distance by reflection light from the reflection prism, and the result of the measurement is inputted to the control means 15. The control means 15 compares the measurement result with the preset distance and calculates the deviation. If there is a deviation as the result of the calculation, on-off of the guiding laser beam 6 or irradiation intensity of the laser beam is changed over time via the driving means 14. In case the deviation is 0, i.e. in case the preset distance agrees with the measured distance, on-off of the laser beam is stopped. Further, the higher the absolute value of the deviation is, the quicker the on-off operation is made. When the surveyor aligns the target 8 with the preset distance, it is judged whether the moving direction is adequate or not by observing the on-off condition of the guiding laser beam 6. Thus, the target 8 can be set accurately only by the judgment of the surveyor on the datum point side.

Figure 3:
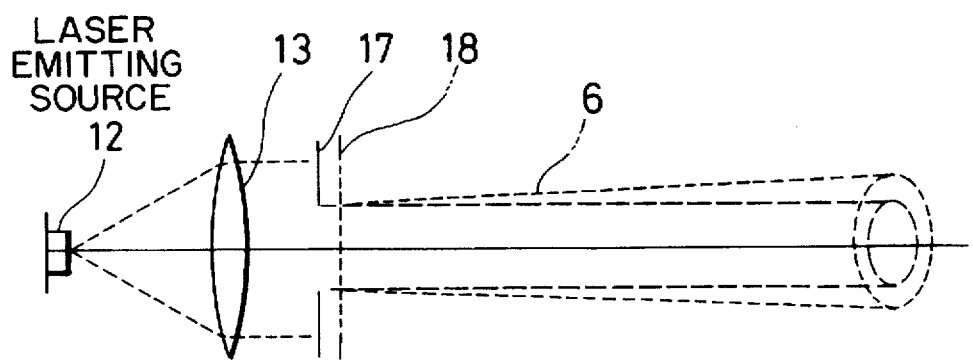
FIG. 3 shows an arrangement of another example of the laser point guide.

FIG. 3 shows an arrangement where the guiding laser beam 6 is formed in an annular shape to facilitate the alignment of the center of the guiding laser beam 6 and the target center of the guide target 10.

A diaphragm 17 for forming the laser beam from the collimator lens 13 into annular shape is set up on the target 8 side of the collimator lens 13, and an apodization filter 18 is provided at a position on the target 8 side of the diaphragm 17. The guiding laser beam 6 coming through the apodization filter 18 is turned to an annular light beam with higher brightness at periphery. This makes it easier to visually recognize the center of the guiding laser beam 6 and to align the center of the guiding laser beam 6 with the target center of the guide target 10.

Figure 4:
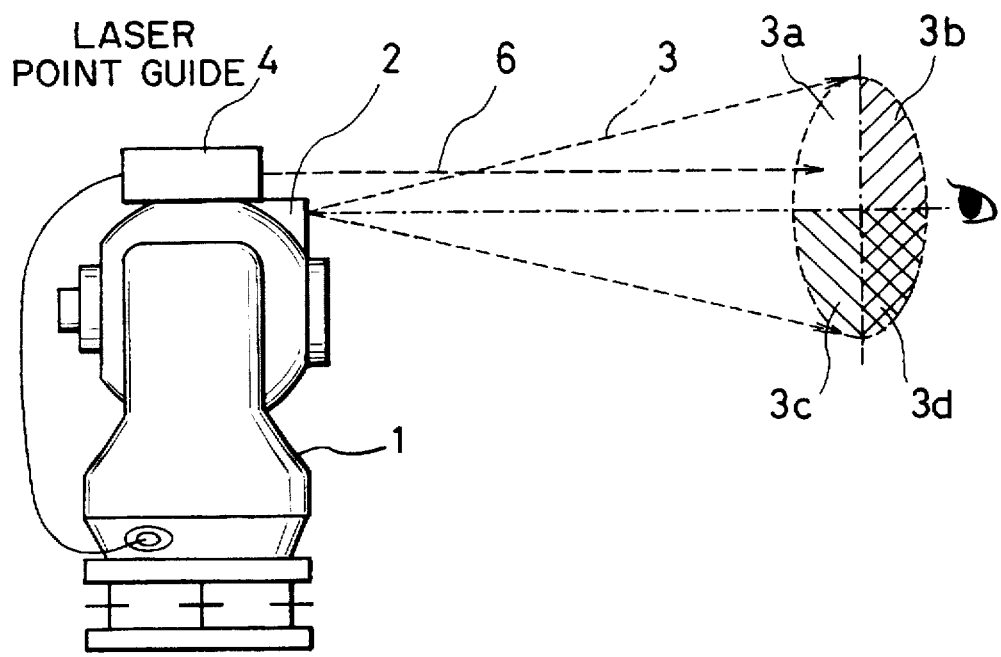
FIG. 4 is a schematical drawing of another embodiment of the invention.

In an example shown in FIG. 4, a laser point guide 4 is set up on a total station 1 equipped with a point guide 2, and a colored light 3 emitted from the point guide 2 is divided not only into two sectors (left and right) but also into four sectors (i.e. also above and under) with different colors. When the colors in four sectors are supposed to be red $3a$, blue $3b$, green $3c$ and yellow $3d$, it is much easier to detect the center of the colored light 3 by identifying these colors. By identifying each of the different colors of the colored light 3, it is possible to find the position of the laser beam of the laser point guide, i.e. whether it is above, under, left or right, and to easily align the target 8 to the position of the laser beam. Aligning to the position of the laser beam is identical with the positioning of the datum point with respect to the total station. Further, the distance is measured by the total station 1, and the result of the measurement is inputted to the laser point guide 4. By turning the guiding laser beam 6 on or off and by changing the irradiation intensity as already described, it is possible to align positions in the front-rear direction. The guiding laser beam from the point guide 2 may be such that a laser beam with different on-off cycle is divided into sectors in addition to coloring.

Next, description will be given on the target 8, which is to match the total station 1.

Figure 5:
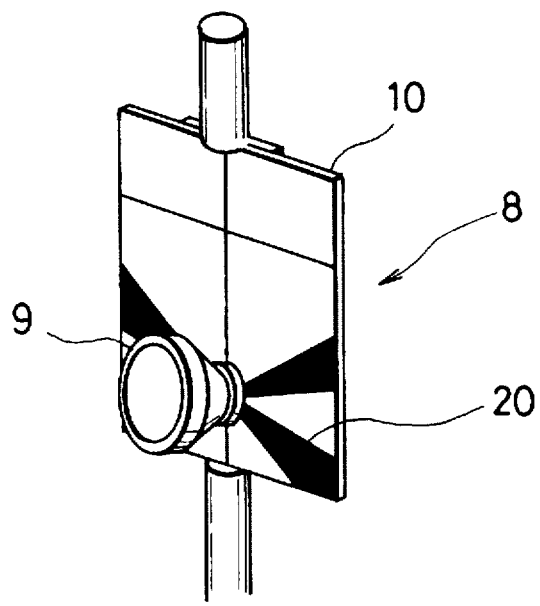
FIG. 5 is a perspective view of an example of a target seen from the front side in the present invention.

In the target 8 shown in FIG. 5, its guide target 10 is enlarged rather than what is shown in FIG. 1, and a prism 9 is directly attached on the guide target 10. In addition to a collimation line 16, a radiating pattern 20 out from the prism 9 is provided on the guide target 10. This pattern 20 facilitates the positioning in case the prism 9 is collimated from the total station 1.

Figure 6:
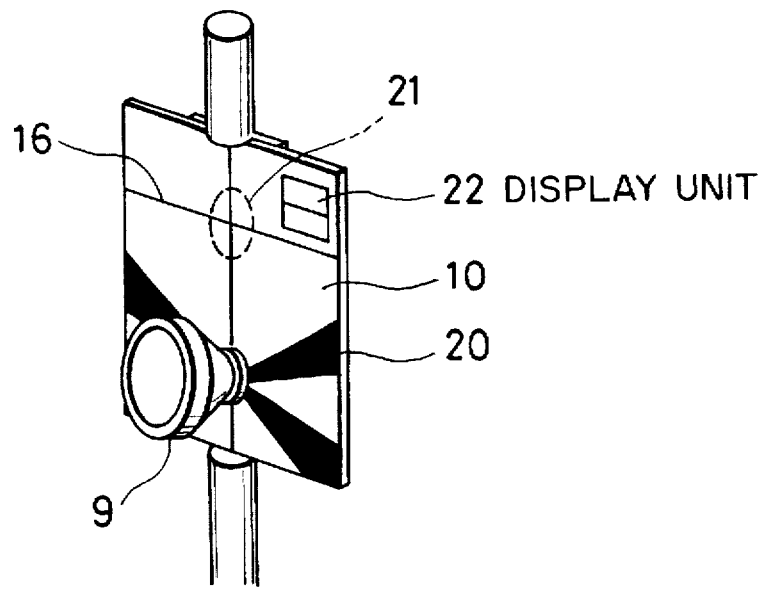
FIG. 6 is a perspective view of an example of a target of the present invention seen from the front side.
Figure 7:
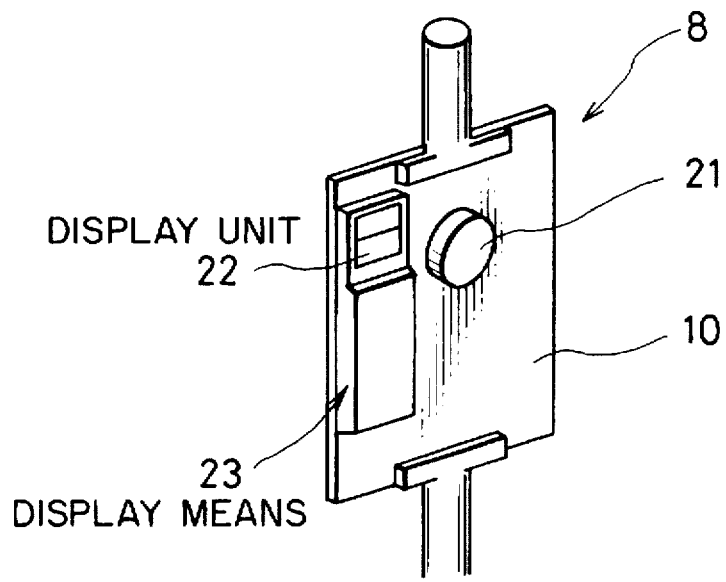
FIG. 7 is a perspective view of an example of a target of the present invention seen from the rear side.
Figure 8:
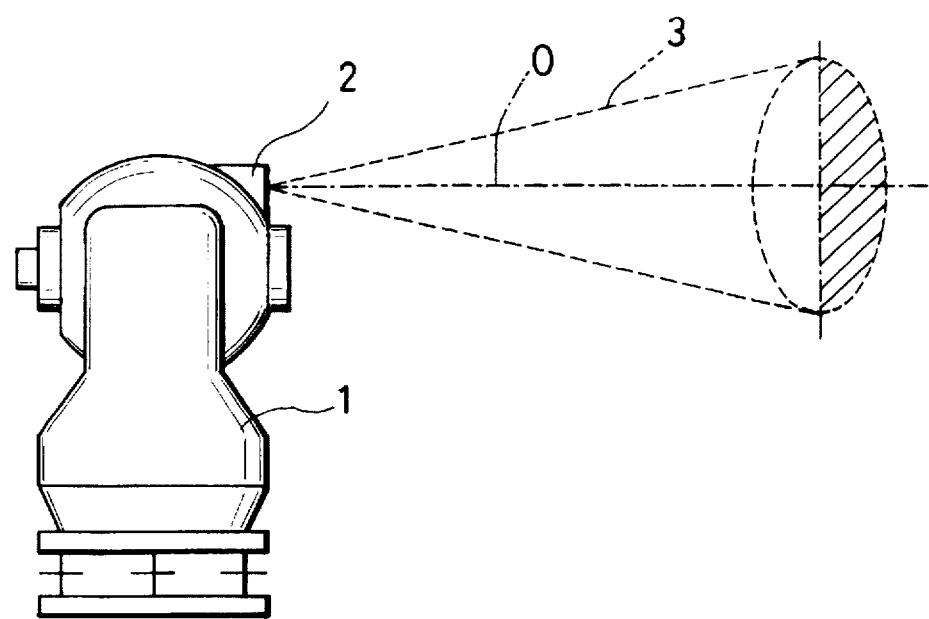
FIG. 8 is a schematical drawing of a conventional example.

FIG. 6 and FIG. 7 each represents an embodiment of the target 8.

A light receiving means 21 is provided on the rear surface of the guide target 10, which consists of transparent or semi-transparent members and the light receiving means 21 is positioned at the center shown by the collimation line 16, and a display means 23 is arranged on rear surface of the guide target 10. The display means 23 is provided with a display unit 22 on each of front and rear surfaces. When the guiding laser beam 6 is received, the light receiving means 21 inputs the light receiving condition to the display means 23. The display means 23 is arranged at a given position on the guide target 10, e.g. on the upper corner as shown in the figures.

The display means 23 identifies the position of the target 8 with respect to the total station 1 based on the light receiving condition of the light receiving means 21, and the identified result is displayed on the display unit 22. This display is, for example, a display of an arrow showing the direction to move the target 8.

Further, the information on the known point side (on the total station 1 side) can be transmitted to the datum point side via the guiding laser beam 6. That is, the information can be transmitted by on-off operation of the guiding laser beam 6 or by changing the irradiation intensity. The control means 15 encodes the information to be transmitted by on-off operation of the guiding laser beam 6, and the display means 23 converts the on-off signals to information and displays it on the display unit 22.

Further, the display means 23 may comprise an audio output unit instead of or together with the display unit 22, whereby voice of the worker on the total station 1 side is converted to an on-off signal of the guiding laser beam 6 by the control means 15. The display means 23 may also comprise a light/audio converter and may convert it to voice again, and the voice of the worker on the total station 1 side may be outputted by the audio output unit. Thus, it is possible to give direct instruction from the total station 1 side to the target 8 side.

The laser point guide 4 may be arranged as a unit and may be mounted on the total station 1, or it may be integrated inside the total station 1. Further, as shown in FIG. 1 and FIG. 4, the distance data from the total station 1 is inputted to the laser point guide 4 via a cable, while it is needless to say that the cable may be omitted if the laser point guide 4 is integrated in the total station 1. Further, when integrated in the total station 1, it is possible to equalize the optical axis of the laser point guide 4 with the collimation axis of the total station 1. In the total station 1, which has a built-in electric motor and can automatically change the collimating direction, surveying operation can be carried out by a single man by remote control operation from the target 8 side. In this case, the information of the total station 1 side displayed on the display unit 22 is useful for the surveying operation of the workers, and it extensively contributes to the improvement of the working efficiency.

Further, in case an audio output unit is provided, an alarm sound may be issued in addition to the on-off operation of the guiding laser beam 6 or changing of the irradiation intensity of laser beam over time, and the interval of the on-off of the alarm sound or the interval of the intensity of the sound to high or low sound may be changed similarly to the guiding laser beam 6. To ensure safety of the eyes of the workers, when reflection light from the prism is not received by the total station, output of the laser point guide may be reduced. As described above, it is possible according to the present invention to facilitate the setting of a datum point and to improve working efficiency because the positions in front-rear or left-right directions can be easily identified at the datum point side without using radio equipment.

What we claim are:

1. A surveying instrument, comprising an object to be irradiated having a prism for measuring distance and a target arranged at a predetermined interval from said prism, a range finder or a range finding angle measuring instrument having a range finder and a projection system having a laser emitting source, said projection system being parallel to said range finder, at said predetermined interval, and adapted to emit a laser beam toward said object to be irradiated, driving means for driving said laser emitting source of said projection system, and control means for controlling the emitting condition of said laser beam by said driving means based on distance data from said range finder to said object to be irradiated.

2. A surveying instrument according to claim 1, wherein said control means is adapted to change the irradiation intensity of said laser beam when there is a deviation between a preset distance and a distance measured by said range finder.

3. A surveying instrument according to claim 1, wherein, when there is a deviation between a preset distance and a distance measured by said range finder, said control means is adapted to change the irradiation intensity of said laser beam according to the extent of said deviation, and is adapted to change the time interval of the intensity change.

4. A surveying instrument according to claim 1, wherein the laser beam from the projection system is modulated.

5. A surveying instrument according to claim 1, wherein the object to be irradiated comprises light receiving means for receiving a guiding laser beam and display means for displaying position information of the object to be irradiated from the range finder or from the range finding angle measuring instrument having a range finder based on the output from the light receiving means and for displaying instruction to the object to be irradiated.

6. A surveying instrument according to claim 1, wherein the object to be irradiated comprises light receiving means for receiving a guiding laser beam and an audio output means for outputting audio signal of position information of the object to be irradiated obtained from the range finder or from the range finding angle measuring instrument having a range finder and of the instruction to the object to be irradiated based on the output from said light receiving means.

7. A surveying instrument according to claim 1, wherein said prism for measuring distance is parallel to said target and said range finder is parallel to said projection system, and wherein said prism is arranged below said target and said range finder is arranged below said projection system.

8. A surveying instrument according to claim 1, wherein said prism for measuring distance is parallel to said target and said range finder is parallel to said projection system, and wherein said prism is arranged above said target and said range finder is arranged above said projection system.

9. A surveying instrument according to claim 1, comprising a laser point guide for emitting a colored light beam and for indicating the irradiation direction of said laser beam, wherein said colored light beam is divided into two sectors (left and right) or four sectors (left and right and above and below) and the direction of said colored light beam is the same as the irradiation direction of said laser beam from said projection system.

* * * * *